May 25, 1937.  H. A. DREFFEIN  2,081,170
FUEL CONTROL APPARATUS
Filed Feb. 29, 1932   2 Sheets-Sheet 1
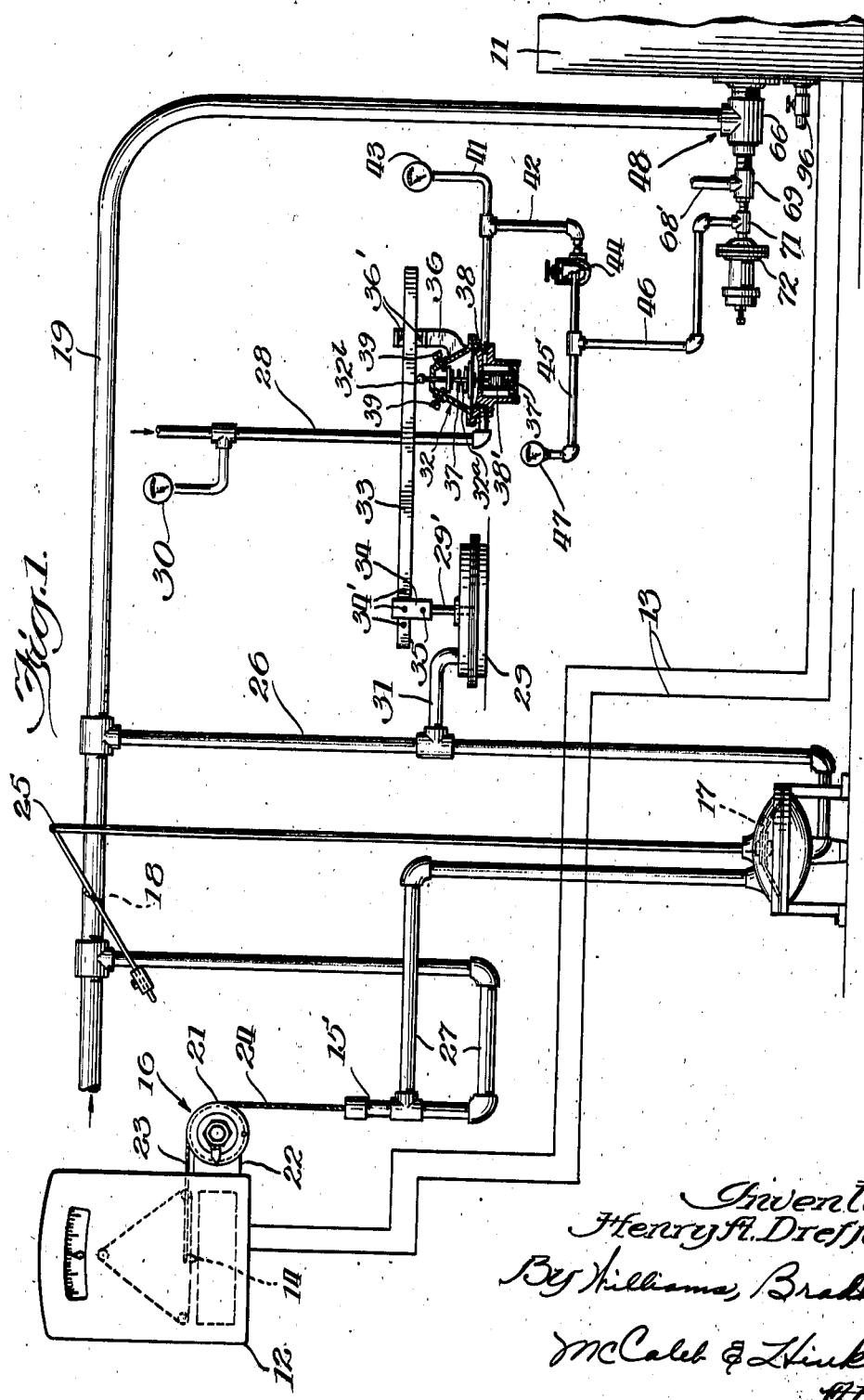

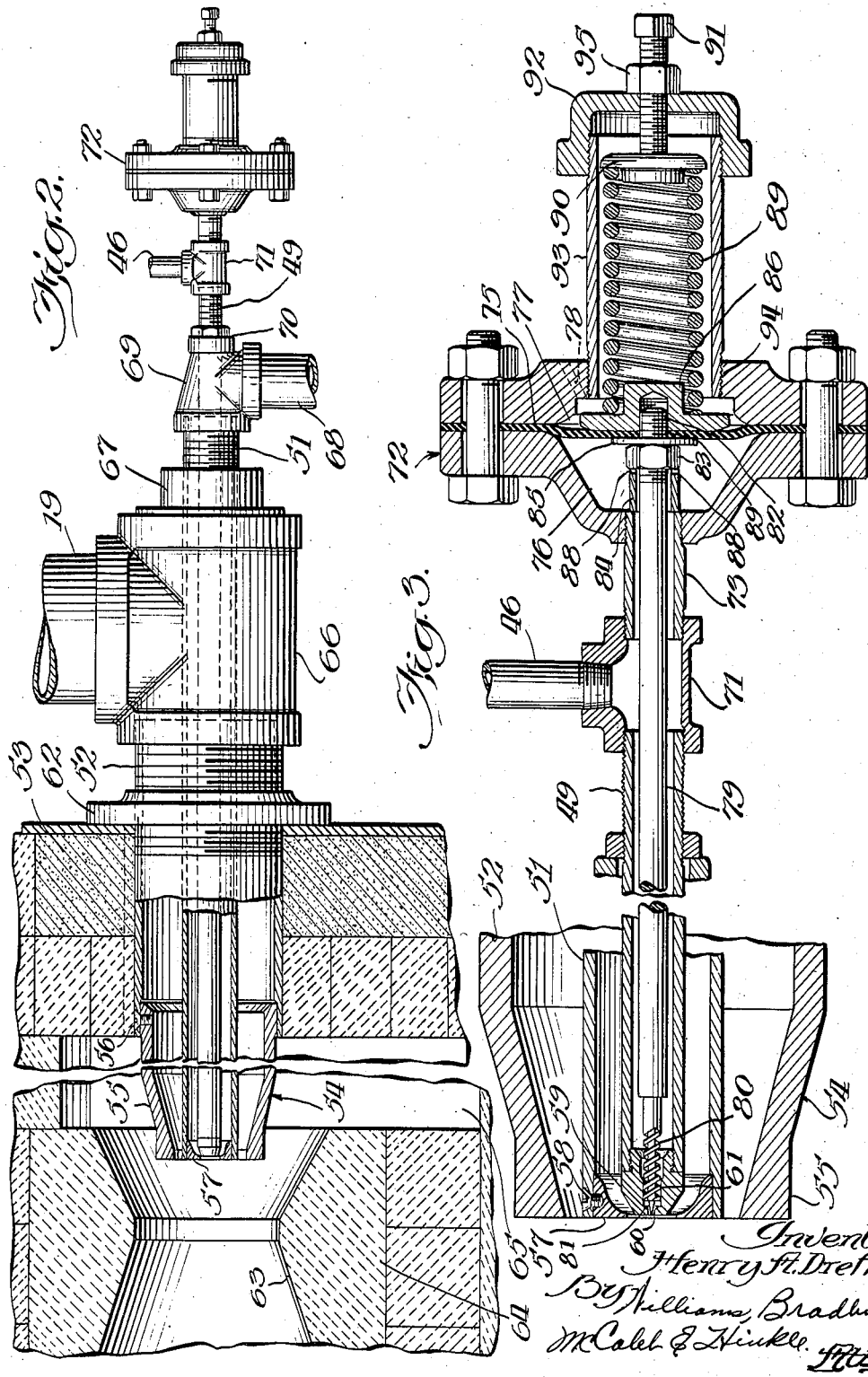

Patented May 25, 1937

2,081,170

UNITED STATES PATENT OFFICE 2,081,170

FUEL CONTROL APPARATUS

Henry A. Dreffein, Chicago, Ill.

Application February 29, 1932, Serial No. 595,713

9 Claims. (Cl. 236—15)

My invention relates to combustion apparatus, and has more particular reference to burners.

The objects of the invention include the provision of a novel and improved gas and/or oil burner having a substantially constant air supply, another air supply variable in response to furnace temperatures, and a fuel supply for supplying fuel at a variable rate and substantially constant pressure to the burner, whereby the fuel is better atomized for combustion, as for example, the fuel is properly atomized even during low heat conditions; whereby the supply of fuel is so controlled as to offset the effects of air which may leak into the furnace in sufficient quantity to provide too lean combustion mixtures at low heat conditions; whereby clogging of the burner is avoided and the burner automatically clears or cleans itself of clogging foreign matter; and whereby the burner may be employed with, for example, pack furnaces, to secure an efficient and automatic combustion apparatus and method suitable for, but not limited to, the treatment of metals and other products.

Other objects and advantages of the invention will be apparent from the following description and from the accompanying drawings, in which similar characters of reference indicate similar parts throughout the several views.

Referring to the drawings;

Fig. 1 is a schematic view of a novel combustion apparatus embodying the features of my invention;

Fig. 2 is an enlarged partial section of the burner portion of the combustion apparatus shown in Fig. 1; and Fig. 3 is a fragmentary section through the burner, of Fig. 2, enlarged to show certain construction details.

Illustrative of the invention as applied to a pyrometrically controlled furnace 11, I have shown in Fig. 1 a pyrometer 12 electrically connected by conductors 13 to a thermocouple, not shown, in the furnace 11, and having a temperature responsive indicator or member 14 which is reciprocable in response to furnace temperature fluctuations or variations. This temperature responsive member 14 is operably connected to actuating or motor control means 15 by a translating assembly 16 for controlling or actuating a valve operating motor or means 17 which is linked or connected to a valve 18 in an air supply main or pipe 19 communicating with the furnace 11.

While I do not wish to limit my invention to a particular type of furnace control, it might be well to point out by way of explanation that in the specific embodiment illustrated in Fig. 1, the translating assembly 16 comprises coaxial rotatable elements 21 carried at a side of the pyrometer 12 by a mounting bracket 22, and a cable 23 extending between one of the rotatable elements 21 and the temperature responsive indicator 14. The other rotatable element 21 is connected by a cable 24 to the actuating means 15, which may take the form of a valve operable in response to furnace temperatures by means of the connection to the translating assembly 16 controlled by the temperature responsive member 14. The operation of the valve 15 controls the valve operating means 17, which is illustrated as a pressure responsive or diaphragm motor connected by a suitable linkage 25 to the valve 18, and supplied with operating pressure from the air supply pipe 19 by pipe fittings 26 communicating with the air pipe 19 at the furnace side of the valve 18, and pipe fittings 27 communicating with the pipe 19 at the supply side of the valve 18 when the valve 15 is open.

As the valve 18 is operated, the rate and pressure at which air for combustion is supplied to the furnace 11 through the pipe 19 is varied, as needed to meet the heat requirements of the furnace controlled by the thermostatic control apparatus. The valve 18 being pyrometrically controlled, causes the air supply rate through and the pressure in the pipe 19 to vary in response to variations in furnace temperatures or setting of the thermostatic control, thereby automatically controlling and regulating the air supplied by the pipe 19 in accordance with the combustion requirements of the furnace. The above described air control means responsive to furnace heat requirements is described in detail in my co-pending Letters Patent application, Serial No. 554,818, filed August 3, 1931, and is recited herein as illustrative of a suitable thermostatic air control for my novel burner.

I may utilize the air pressure variation in the pipe 19 and hence in the pipe fittings 26 communicating therewith at the furnace side of the valve 18 to vary the rate at which a suitable fuel, such as oil, is supplied to the furnace 11 under pressure from a fuel supply main or pipe 28. A suitable pressure indicator 30 may be connected to the pipe 28 for measuring the supply pressure of the fuel.

In order to vary and control the fuel supply, I employ a fuel regulator including a pressure responsive means or dash-pot 29 connected by pipe fittings 31 to the fittings 26 for controlling or actuating a valve or regulator 32 connected to the fuel pipe 28. The regulator is operated by a lever 33 adjustably connected to the dash-pot plunger or stem 29' by means of a connecting plate or member 34 pinned or otherwise secured at a desired position 34' to the lever 33 and secured as at 35 to the plunger 29', the regulator having a bearing arm 36 providing a fulcrum or knife edge 36' about which the lever 33 may be operated to actuate the stem 32a of the regulator, which is connected to the lever intermediate the fulcrum 36' and the connection 34' by means of a knife edge 32b. The regulator 32 may be any suitable valve whereby the effective forces from the dash-pot acting through the lever 33 and from a coil spring 37 tend to actuate a diaphragm 38 and a valve plunger 38' in a valve opening direction against a coil spring 37' tending to close the valve. The force supplied by the spring 37 may be adjusted by adjustment screws 39 for adjusting the valve to operate at various desired pressures in the dash-pot.

The output side of the regulator 32 is connected by suitable pipe fittings 41 and 42 to a pressure indicator 43 and a fuel metering valve 44, respectively, for measuring the fuel pressure and for regulating the fuel pressure without clogging. I have found that a V-slot valve is not readily susceptible to pressure variations due to clogging foreign matter collecting therein, and such a valve may be used for metering the fuel. The V-slot or fuel metering valve 44 is in turn connected by suitable pipe fittings 45 and 46, to a pressure indicator 47, and one or more burners 48, respectively, for measuring the furnace supply pressure and for supplying heat to the furnace 11.

This novel burner 48, shown more particularly in Figs. 2 and 3, comprises a fuel supply pipe 46, a constant pressure air supply pipe 51 and a variable air supply pipe 52, concentrically spaced and assembled in a wall 53 of the furnace burner portion, and a burner tip 54. This burner tip 54 comprises an outer air nozzle 55 secured in the end of the variable air supply pipe 52 by retaining screws 56, an inner air nozzle 57 held in the end of the constant air supply pipe 51 by retaining screws 58, and a fuel nozzle or tip 59 threaded or otherwise suitably secured at the end of the fuel pipe 49 and having a fuel orifice 60 communicating with the pipe 49 through an enlarged passage or chamber 61 provided in the fuel tip 59.

A packing ring or collar 62 embraces the pipe 52 adjacent the wall 53 to effectively close the pipe opening therein. The burner tip 54 cooperates with a nozzle or orifice 63 in a burner portion wall or partition 64 to provide a suitable mixing chamber for the fuel from the supply pipe 49 and air from the pipes 51 and 52, or to provide an injector to entrain air or gas for combustion from a chamber 65 between the walls 53 and 64.

The pipe 19 is connected to the pipe 52 by means of a T connection 66 for supplying air at a variable rate and/or pressure to the burner 48. The T connection 66 has a reducing coupler or connector 67 for supporting the concentric pipes 49 and 51. The pipe 51 communicates with a suitable source of air, not shown, through a main or pipe 68 and a T connection 69. The T connection 69 has a reducing coupler 70 for supporting the fuel supply pipe 49 of the burner which communicates with the supply pipe 46 through a T connector 71.

This T connector 71 is also connected to a housing 72 by means of a nipple or pipe 73. The housing 72 encloses a movable member or pressure responsive diaphragm 75 dividing the housing 72 into an oil chamber 76, and a chamber 77 at atmospheric pressure by virtue of a port or opening 78.

An object of the present invention is the provision of a burner for furnaces that may be heated by the combustion of gas and/or oil and to supply such fuel to the burner so as to avoid clogging and to avoid the effects of leakage air in the furnace at low heat conditions. To this end I provide a reciprocable plunger or stem 79 having a threaded or grooved portion 80 slidably receivable in the chamber 61 and terminating in a tip 81 receivable in the fuel or delivery orifice 60. This construction provides a needle valve for controlling the delivery of oil from the pipe 49 through the spiral groove 80 and the delivery orifice 60 to the mixing orifice or nozzle 63 for mixture with air from the pipes 51 and 52.

The plunger or stem 79 is axially arranged within the fuel pipe 49 and extends through the nipple 73 into the housing 72 where it is connected to the diaphragm 75 for withdrawing the plunger or stem when the oil pressure in the pipe 49 or oil chamber 76 reaches a predetermined value. A suitable connection between the diaphragm and the plunger may be made by providing the plunger with a threaded end portion 82 provided with a nut 83 carrying at one side a spacer sleeve 84 and having at the other side a washer 85 against which the diaphragm is secured by a nut 86 threaded on the end portion 82 which extends through a central aperture 89 in the diaphragm for this purpose.

The spacer sleeve 84 and the nut 83 serve as a stop for the diaphragm 75 at the position where the stem or plunger substantially closes the orifice 60 and the sleeve 84 is provided with a plurality of slots or apertures 88 providing communication between the oil chamber 76 and the pipe 73 to admit oil to the chamber 76 from the oil supply pipe 46. The diaphragm 75 and hence the plunger 79 are resiliently and adjustably held in this closed position by a coil spring 89 carried between the nut 86 and an adjustable spring seat or button 90. This button 90 is carried at the inner end of an adjustment screw or bolt 91 threaded into a cap or cover 92 of a spring housing or sleeve 93 threadably secured as at 94 to the housing 72 at the chamber 77 thereof. A lock nut 95 serves to lock the screw 91 in an adjusted position.

The adjustment screws 39 are originally adjusted so that the pipe 28 provides the proper oil supply through the regulator 32 for the minimum air supply to the burner including the air from the constant and variable air supply pipes. The oil pressure supplied to the burner is then automatically variable as the pressure of air at the furnace side of the valve 18 varies in response to furnace temperatures. Oil is admitted at this pressure to the burner or burners 48, the oil passing through the V-slot valve 44 and the pipe 46 into the oil supply pipe 49 of the burner. As the oil is introduced into the pipe 49, it is distributed in the pipe about the plunger 79 and in the pipe 73, as well as the oil chamber 76. As the oil supply pressure increases, it tends to displace the movable member or diaphragm 75 to compress the spring 89 and to retract the tip portion 81 of the plunger so as to admit oil more freely through the delivery orifice 60 to the mixing nozzle or orifice 63. Upon a reduction of the oil supply pressure, the spring 89 tends to move the diaphragm and the plunger attached thereto forward toward a delivery orifice closing position.

In operation the regulator 32 is adjusted to supply oil through the pipes 42 and 46 to the burner or burners 48 in sufficient quantities or at sufficient volume even when the air control valve 18 has been operated to reduce the variable air supply rate to a minimum value, to maintain the stem or plunger 79 in such a position that the fuel or oil delivered through the orifice or nozzle 60 will provide a rich mixture at the rate at which air is supplied from the constant air pressure pipe 51. Thus, even at low heat requirements or conditions in the furnace, sufficient fuel or oil is supplied to the furnace to provide proper mixture with the air from the constant pressure supply source, the minimum supply of air through the pipe 19, and the air in the furnace as a result of infiltration or leakage, and this fuel is discharged from the delivery tip at such a pressure as will, with the pressure of air from the pipe 51, assure proper atomization of the mixture for the combustion thereof.

Thus in setting the system for operation, the regulator 32 is initially set by adjusting the screws 39 to supply the proper volume of oil while the air supply from the constant and variable supply sources is a minimum. In other words, the regulator is so adjusted, that the proper oil supply is provided for this minimum air supply. In this manner, I assure proper fuel mixtures at low heat conditions. Thereafter the oil supply is automatically controlled and varied, as described. to provide proper fuel mixtures as the air supply changes in response to furnace heat requirements.

As more heat is required by, or desired in the furnace 11, the valve 18 is actuated through the thermostat or pyrometric control means to increase the air supply rate in the pipe 19 thereby supplying pressure through the pipes 26 and 31 to the pressure responsive means 29 for operating the regulator 32 to increase the rate at which oil or fuel is supplied through the pipes 42 and 46 to the burner or burners 48. This increased oil supply by virtue of the diaphragm 75 and the spring 89 acting on the valve stem or plunger 79 is discharged through the orifice 60 to provide, with the increased air supply by virtue of the operation of the valve 18, the proper combustion mixture for the heat conditions called for by the thermostat in the furnace, the discharge pressure in the orifice 60 remaining substantially constant.

If any dirt or other foreign matter should collect in the needle valve, the oil pressure in the oil chamber 76 will increase and move the diaphragm to retract the plunger and cause a larger effective opening of the delivery orifice 60 so that for practical purposes, there will be substantially no change in the flow of oil. The movement of the plunger by the increased oil pressure on the diaphragm 75 would permit the foreign deposit or dirt accumulated in the tip to be blown or forced through the delivery orifice, whereupon the pressure in the pipe 49 will return to its normal value. The spring 89 then forces the plunger forward to its original position.

Thus, the oil is supplied to my novel burner at the volume or rate required for combustion with the amount of air supplied to the burner. For low heat conditions in the furnace, I am enabled, by the proper adjustment of the regulating valve, to obtain a sufficiently rich fuel mixture in the furnace to offset the effects of air leaking into the furnace openings and to mix with the air from the variable and constant air supply pipes for a suitable combustion mixture.

A primary feature of the invention is the substantially constant fuel pressure at the burner tip throughout a wide range of fuel supply pressures. The constant air supply from the pipe 51, together with the substantially constant oil discharge pressure at the nozzle 60, assures proper atomizing and mixture of the combustion materials even at low heat conditions, during which the air supplied by the variable air supply pipe 52 is at a minimum value. This substantially constant oil pressure, together with the resilient actuation of the plunger 79, not only serves to provide proper fuel mixtures at low operating conditions, but also serves as a self-cleaning feature of the grooved or threaded burner tip construction.

It will, of course, be apparent that the invention contemplates the supply of air and a fuel in, for example, a gaseous state through the variable supply pipe 52, or gas supplied to the chamber 65 from a supply pipe 96 may be taken therefrom by the injector action of the burner tip 54 and the orifice 63 for the purpose of operating the novel burner as a combined gas and oil burner.

Having thus described my invention, what I claim as new and desire to secure by Letters Patent of the United States, is:

1. In a combustion apparatus, a burner, a burner air supply source, a variable pressure burner oil supply source, means for varying the supply of oil delivered to said burner in accordance with the supply of air in said burner, and means for maintaining the burner oil discharge pressure substantially constant.

2. In a combustion apparatus, a burner, a variable burner air supply source responsive to the temperatures of said apparatus, a variable pressure burner oil supply source controlled by said air supply source, and means for maintaining the burner oil discharge pressure substantially constant throughout the temperature range of said apparatus.

3. In a combustion apparatus, a burner, an air supply source for supplying air to said burner, an air control valve, pyrometrically controlled, pressure responsive, valve operating means having pressure supply connections at opposite sides of said air control valve for operating the same in response to temperatures in the combustion apparatus, another air supply source for supplying air at substantially constant pressure to said burner, a fuel supply source for supplying fuel to said burner, a fuel control valve, pressure responsive, valve operating means having a pressure supply connection with said air control valve at the discharge side thereof for operating said fuel control valve to vary the supply of fuel to said burner in accordance with the variations in the air supplied thereto from the first said air supply source, a mixing chamber at said burner, a delivery tip for delivering air from said sources and fuel from said source to said mixing chamber, and means for maintaining the fuel delivery pressure substantially constant.

4. In a combustion apparatus, a burner, an air supply source for supplying air to said burner, an air control valve, pyrometrically controlled, pressure responsive, valve operating means having pressure supply connections at opposite sides of said air control valve for operating the same in response to temperatures in the combustion apparatus, another air supply source for supplying air at substantially constant pressure to said burner, a fuel supply source for supplying fuel to said burner, a fuel control valve, pressure responsive, valve operating means having a pressure supply connection with said air control valve at the discharge side thereof for operating said fuel control valve to vary the supply of fuel to said burner in accordance with the variations in the air supplied thereto from the first said air supply source, and means for maintaining the fuel delivery pressure substantially constant.

5. In a combustion apparatus, a burner, an air supply source for supplying air to said burner, an air control valve, pyrometrically controlled, pressure responsive, valve operating means having pressure supply connections at opposite sides of said air control valve for operating the same in response to temperatures in the combustion apparatus, another air supply source for supplying air at substantially constant pressure to said burner, an oil supply source for supplying oil to said burner, an oil control valve, pressure responsive, valve operating means having a pressure supply connection with said air control valve at the discharge side thereof for operating said oil control valve to vary the supply of oil to said burner in accordance with the variations in the air supplied thereto from the first said air supply source, a mixing chamber at said burner, a delivery tip for delivering air from said air supply sources and oil from said oil supply source to said mixing chamber, and means for maintaining the delivery pressure of oil from said delivery tip substantially constant.

6. In a combustion apparatus, a substantially constant pressure, variable flow source of fuel supply, a substantially constant pressure source of air supply for supplying sufficient air for minimum requirements of said apparatus, a variable pressure, variable flow source of air supply for supplying additional air for more than minimum requirements of said apparatus, pyrometrically controlled means for controlling the last said source of air supply in accordance with the heat requirements of said combustion apparatus, means for controlling the flow of fuel, and means automatically operable with said pyrometrically controlled means for operating the fuel control means to vary the fuel flow in accordance with the variations in the supply of air from said variable pressure, variable flow source of air supply.

7. In a combustion apparatus, a variable pressure fuel supply source, a substantially constant pressure source of air supply for supplying sufficient air for minimum heat requirements of said apparatus, a variable pressure variable flow source of air supply for supplying additional air for more than minimum heat requirements of said apparatus, a burner connected in communication with said air and fuel supply sources for discharging combustible mixtures therefrom, and pressure responsive means in and coacting with said burner for maintaining the pressure of fuel discharged by said burner substantially constant.

8. In oil combustion apparatus, an air supply source, a variable pressure oil supply source, means for varying the supply of oil to said apparatus in accordance with the supply of air therein, a burner tip connected in communication with said air and oil supply sources for discharging combustible mixtures therefrom, and pressure responsive means in and coacting with said burner tip for maintaining the pressure of oil discharged by said burner tip substantially constant.

9. In oil combustion apparatus, an air supply source, a variable pressure oil supply source, means for varying the supply of oil to said apparatus in accordance with the supply of air therein, a burner tip connected in communication with said air and oil supply sources for discharging combustible mixtures therefrom, a valve in said burner tip, and pressure responsive means for varying the position of said valve when the oil pressure varies anteriorly thereof whereby to regulate the pressure of oil discharged by said tip.

HENRY A. DREFFEIN.